(12) United States Patent
Deng

(10) Patent No.: US 11,451,904 B2
(45) Date of Patent: Sep. 20, 2022

(54) AUDIBLE END CAP AND HANDHELD METAL DETECTOR

(71) Applicant: SHENZHEN CHECKPOINT SECURITY ELECTRONICS CO., LTD., Shenzhen (CN)

(72) Inventor: Maoquan Deng, Shenzhen (CN)

(*) Notice: Subject to any disclaimer, the term of this patent is extended or adjusted under 35 U.S.C. 154(b) by 0 days.

(21) Appl. No.: 17/168,183

(22) Filed: Feb. 5, 2021

(65) Prior Publication Data

US 2022/0201390 A1 Jun. 23, 2022

(30) Foreign Application Priority Data

Dec. 21, 2020 (CN) .......................... 202011518267.1

(51) Int. Cl.
*H04R 1/44* (2006.01)
*H04R 1/28* (2006.01)

(52) U.S. Cl.
CPC ................. *H04R 1/44* (2013.01); *H04R 1/28* (2013.01)

(58) Field of Classification Search
CPC ................................... H04R 1/44; H04R 1/028
See application file for complete search history.

(56) References Cited

U.S. PATENT DOCUMENTS 9,347,798 B1* 5/2016 Johnson ................. H04R 1/028

* cited by examiner

*Primary Examiner* — Kile O Blair
(74) *Attorney, Agent, or Firm* — Analects Legal LLC

(57) ABSTRACT

An audible end cap is provided, including a waterproof loudspeaker for generating multiple alarm sound combinations, wherein the diameter of the waterproof loudspeaker is greater than 2 cm; a back cover provided with a first connecting portion whereby the back cover is capable of being fixedly installed on a metal detector, wherein the waterproof loudspeaker is installed in the back cover; an audio connector, electrically connected to the waterproof loudspeaker, wherein the waterproof loudspeaker is capable of receiving and emitting the sound signal output by the metal detector through the electrical connection between the metal detector and the audio connector. The waterproof loudspeaker is installed in the back cover through multiple waterproof designs. The audible component and the main body of the metal detector, which can be charged after the back cover is removed, are designed separately. When damaged, the loudspeaker can be replaced separately without replacing the entire circuit board.

13 Claims, 12 Drawing Sheets

AUDIBLE END CAP AND HANDHELD METAL DETECTOR

CROSS-REFERENCE TO RELATED APPLICATIONS

This application claims priority to Chinese Patent Application No. 202011518267.1, filed Dec. 21, 2020, the contents of which are incorporated herein by reference.

BACKGROUND

1. Technical Field

The present application relates to a field of metal detectors technology, especially to an audible end cap and handheld metal detector.

2. Description of Related Art

Metal detectors are widely used in security inspection, mine detection and recreational detection. The products involved in this patent are mainly related to the field of recreational detection. In the field of recreational and security detection, the detectors are mainly divided into full-size metal detectors and metal detectors in terms of size is between. Both the two kinds of metal detectors are composed of detection coil components, signal processing parts, acoustic optic and vibration alarmers and other components. During the detection process, the user first uses the full-size metal detector for large area scanning, and then starts to use the metal detector to accurately locate the target after hearing the expected signal.

Metal detection activities are mainly carried out in outdoor spaces such as fields and rivers. Metal detectors at the present stage are waterproof based on this feature. Since full-size metal detectors are large in size, it is allowed to use a coil driven loudspeaker with a diameter of 40 mm or larger as the sound alarm component in the circuit control box. Another significant advantage is that the coil driven loudspeaker can emit a variety of alarm sound combinations according to the requirements of the developer, such as linear alarm sound, pulse alarm sound, a mixture of the two alarm sounds, or even customized melodic music. It can also remind users of the types of underground metal by emitting high and low tones. Conventional handheld metal detectors are smaller in size than full-size metal detectors. For example, the metal detection pinpointer in the handheld metal detector is only about the size of an electronic toothbrush, and the diameter is limited to about 4 cm based on the size of the human palm. Therefore, the existing products on the market at the present stage all use a piezoelectric buzzer, and the buzzer is hidden inside the detection body to meet the waterproof requirements. In handheld metal detectors, the waterproof design reduces the volume of the buzzer by more than half, which is not conducive for the user to hear the alarm sound of the detector in time, and this type of buzzer can only generate a single pulse alarm, instead of multiple alarm sounds which help users distinguish metal types. And after the loudspeaker is damaged, it cannot be replaced separately, and the entire circuit board needs to be replaced.

DETAILED DESCRIPTION

Figure 1:
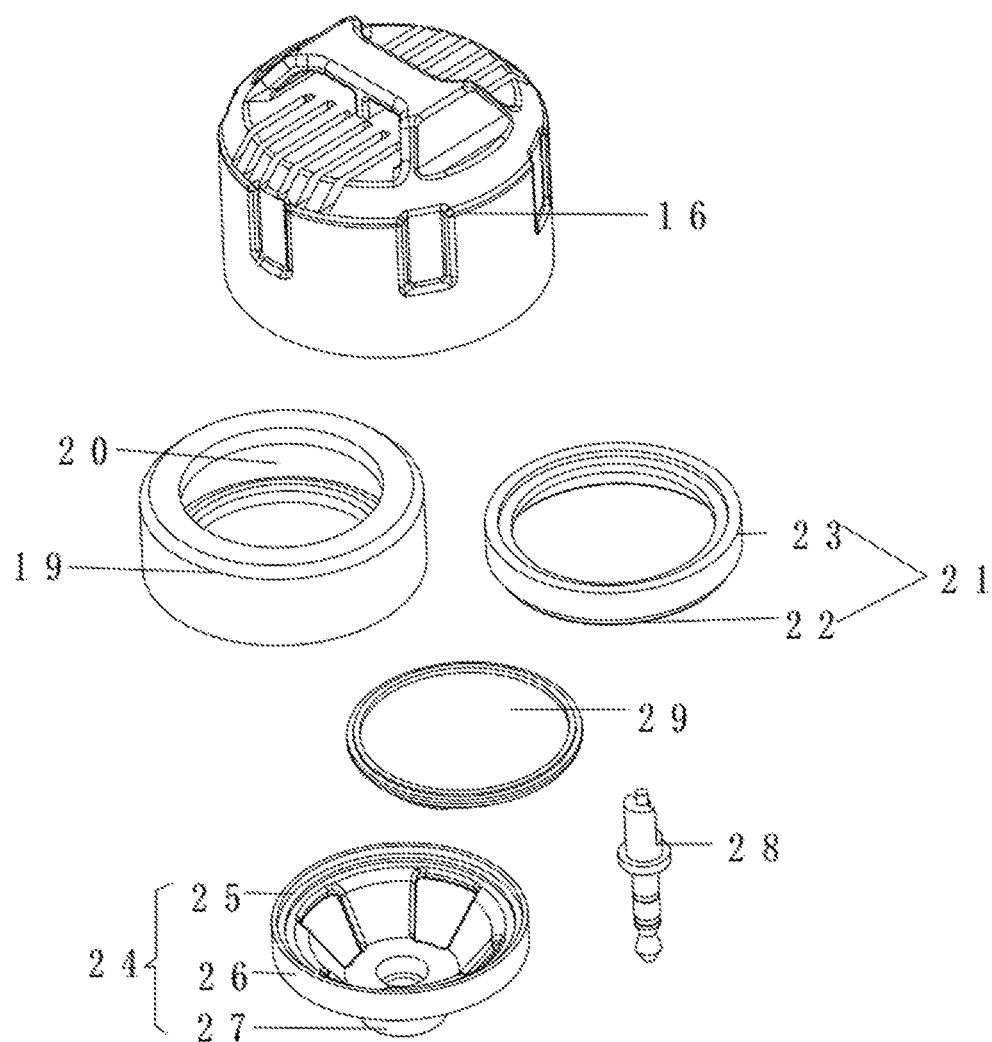
FIG. 1 shows an exploded view of the audible end cap according to the present application.

The present application will be further described below with reference to the accompanying drawings for further clearly and fully discussing the technical solutions of the present application.

With reference to FIGS. 1 to 6, an audible end cap 15 is provided in the present application, including a waterproof loudspeaker 29 a back cover 16 and an audio connector 28. The waterproof loudspeaker 29 is used for generating multiple alarm sound combinations, in which the diameter of the waterproof loudspeaker 29 is greater than 2 cm. The waterproof loudspeaker 29 is installed in the back cover 16, and the back cover 16 is provided with a first connecting portion 17, through which the back cover 16 can be fixedly installed on the metal detector. The waterproof loudspeaker 29 is electrically connected to the audio connector 28, and the metal detector is electrically connected to the audio connector 28, so that the waterproof loudspeaker 29 can receive and emit the sound signal output by the metal detector. The audible end cap 15 further includes a protective collar 19, a first protective bracket 21, and a second protective bracket 24. The waterproof loudspeaker 29 is fixedly clamped between the first protective bracket 21 and the second protective bracket 24. The protective collar 19 is sleeved and fixed on the outer periphery of the first protective bracket and the second protective bracket. And the protective collar 19 is fixedly installed in the back cover 16. The protective collar 19, the first protective bracket 21, the second protective bracket 24 and the waterproof loudspeaker 29 are all contained in the back cover 16. The protective collar 19 is provided with a snapping groove 20. The first protective bracket 21 includes a first snapping ring plate 23, and the second protective bracket 24 includes a second snapping ring plate 26. The first snapping ring plate 23 and the second snapping ring plate 26 abut against each other and are fixedly engaged in the snapping groove 20. The first protective bracket 21 further includes a docking ring plate 22. A docking groove 25 is provided on the second protective bracket 24. When the first protective bracket 21 and the second protective bracket 24 clamp and fix the waterproof loudspeaker 29, the docking ring plate 22 is inserted into the docking groove 25. The back cover 16 is provided with a receiving cavity 18. The protective collar 19 is fixedly installed in the receiving cavity 18. The second protective bracket 24 further includes a mounting barrel 27, and the audio connector 28 penetrates the entire mounting barrel 27.

In this embodiment, the waterproof loudspeaker 29 is first placed in the second protective bracket 24, and then the connecting junction between the waterproof loudspeaker 29 and the second protective bracket 24 is coated with resin sealant, so that the connecting junction between the waterproof loudspeaker 29 and the second protective bracket 24 can be sealed and waterproof. Then the first protective bracket 21 is fixed and covered on the waterproof loudspeaker 29. The first snapping ring plate 23 and the second snapping ring plate 26 are engaged in the snapping groove 20 so that the protective collar 19 is sleeved on the outer periphery of the first protective bracket 21 and the second protective bracket 24. The protective collar 19 can play a very good protective role because the protective collar 19 is made of rubber material. The docking ring plate 22 is arranged at the bottom of the first protective bracket 21. The diameter of the docking ring plate 22 is smaller than that of the first snapping ring plate 23, and it can just be inserted into the docking groove 25. In this embodiment, the audio connector 28 is an audio plug, and the audible end cap 15 can be connected to the metal detector by directly plugging the audio plug into the metal detector. The waterproof loudspeaker 29 is a diaphragm loudspeaker with a diameter of 2.5 cm, which can emit a variety of alarm sound combinations according to the need of the developer, such as linear alarm sound, pulsed alarm sound, a mixture of the two, or even customized melodic music. And the waterproof loudspeaker 29 can also remind users of the types of underground metal by emitting high and low tones. The top of the back cover 16 can be designed in different shapes according to actual conditions. For example, two hanging holes are provided on the top of the back cover 16 to facilitate the suspension of the back cover 16. Another advantage of placing the loudspeaker at the end place is to avoid interference of detection coil.

With reference to FIGS. 1 to 10, a handheld metal detector 10 is provided in the present application, including a host 10 and the above-mentioned audible end cap 15. The host 10 is provided with a second connecting portion 13. The back cover 16 can be installed on the tail portion of the host 10 through the screw connection between the first connecting portion 17 and the second connecting portion 13. A waterproof ring 14 is fixedly sleeved at the bottom of the outer circumference of the second connecting portion 13. When the first connecting portion 17 is screwed and rotated to the bottom of the second connecting portion 13, the waterproof ring 14 can abut against the first connecting portion 17. The host 10 is also provided with an audio output interface 12, and the audio connector 28 can be inserted into the audio output interface 12.

In this embodiment, the first connecting portion 17 and the second connecting portion 13 are provided with mutually matched threads, through which, the back cover 16 can be freely installed and disassembled on the tail portion of the host 10. Since the waterproof ring 14 is arranged at the bottom of the outer circumference of the second connecting portion 13, when the first connecting portion 17 and the second connecting portion 13 are completely engaged, the waterproof ring 14 can ensure good waterproof performance between the connecting junction. The audio output interface 12 is an audio socket, and the audio connector 28 is directly inserted into the audio output interface 12 to electrically connect the audible end cap 15 and the host 10.

Figure 2:
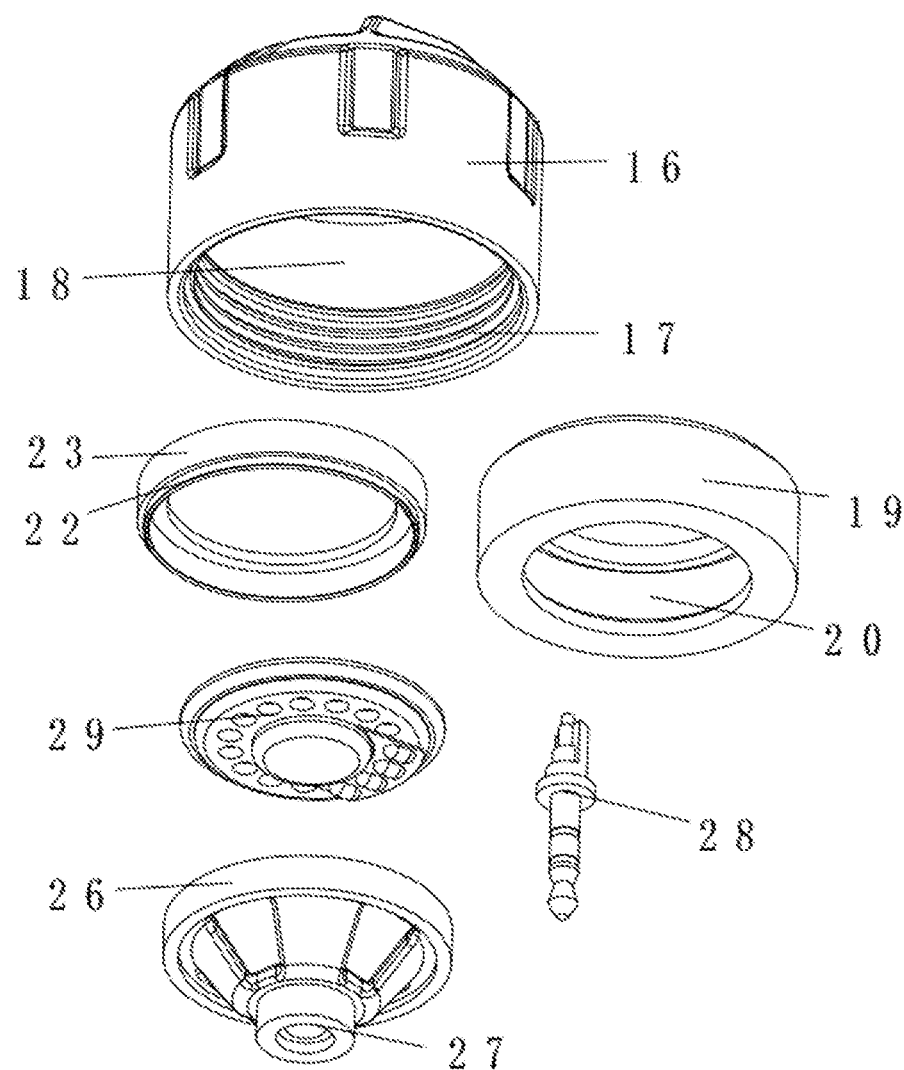
FIG. 2 shows an exploded view of the audible end cap according to the present application from another angle.
Figure 3:
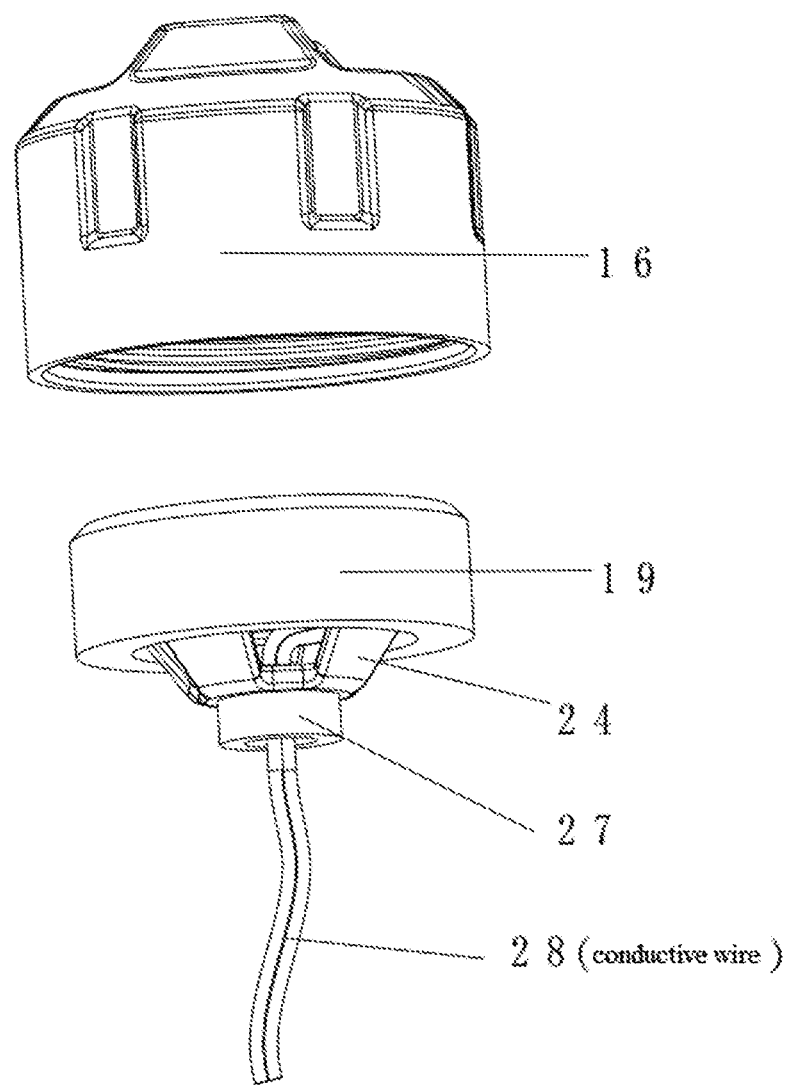
FIG. 3 shows a partial exploded view of the second connection mode of the audible end cap according to the present application.
Figure 4:
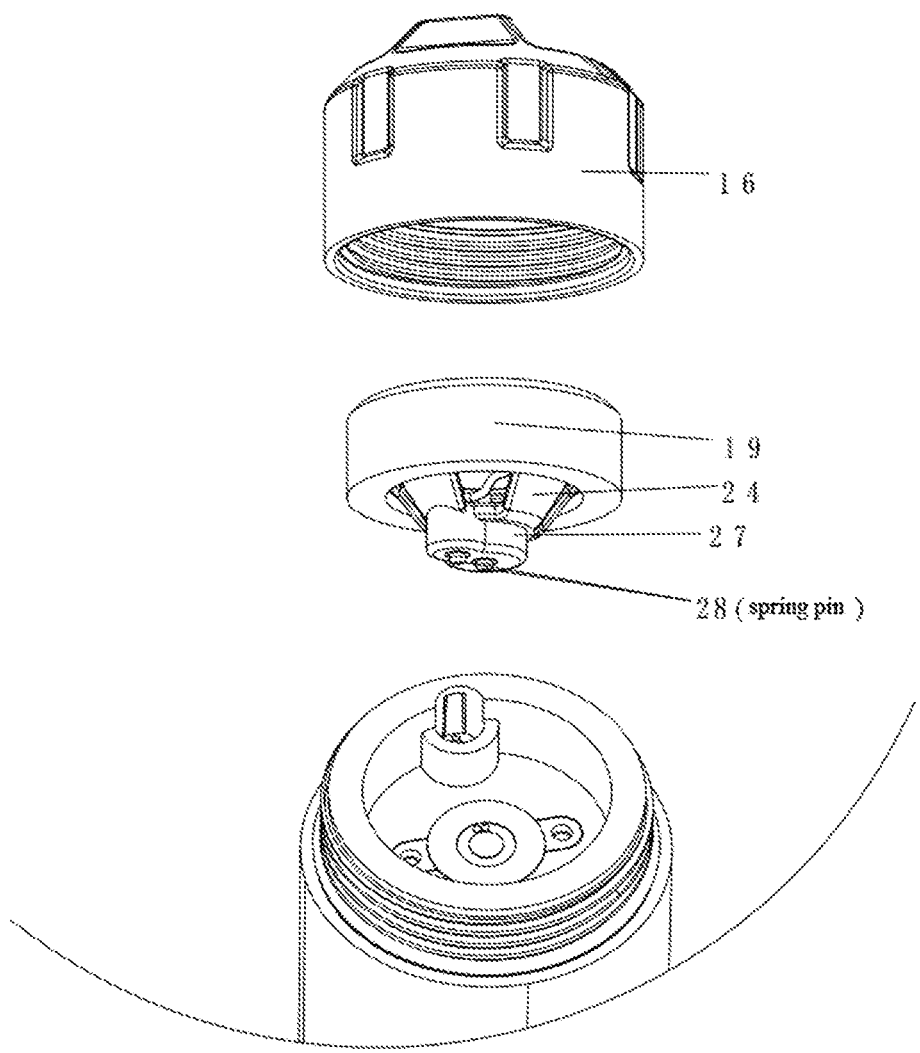
FIG. 4 shows a partial exploded view of the third connection mode of the audible end cap according to the present application.
Figure 5:
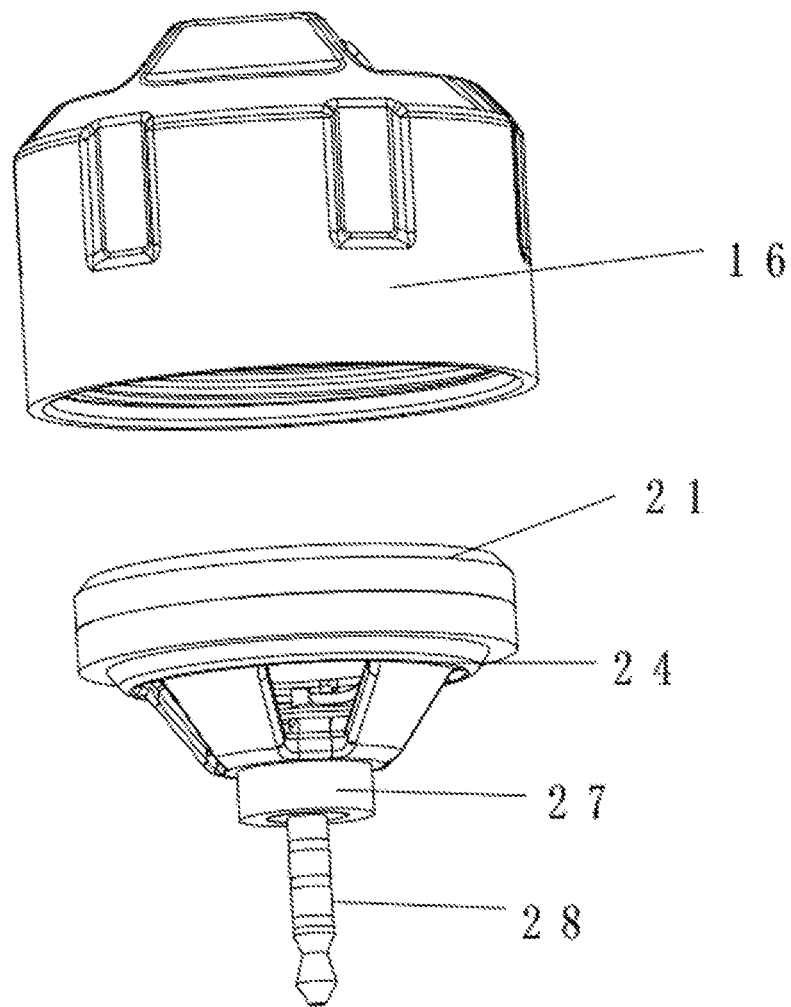
FIG. 5 shows a partial exploded view of another embodiment of the audible end cap according to the present application.
Figure 6:
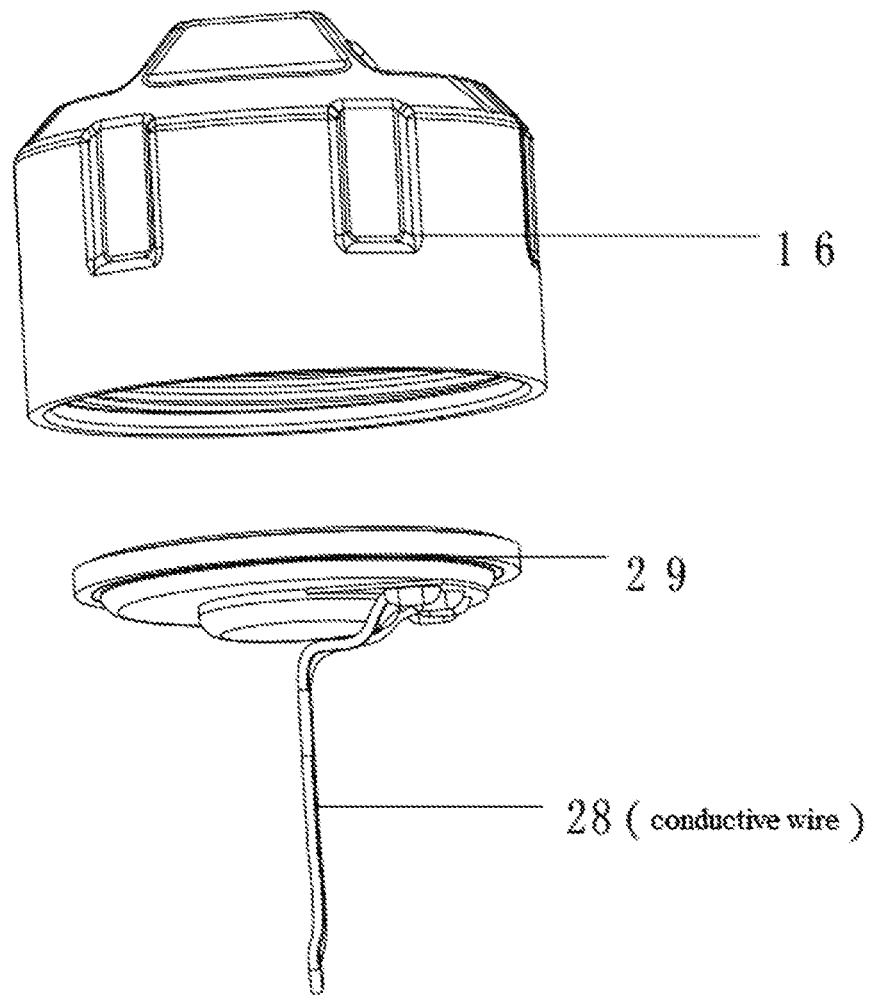
FIG. 6 shows a partial exploded view of another embodiment of the audible end cap according to the present application.
Figure 7:
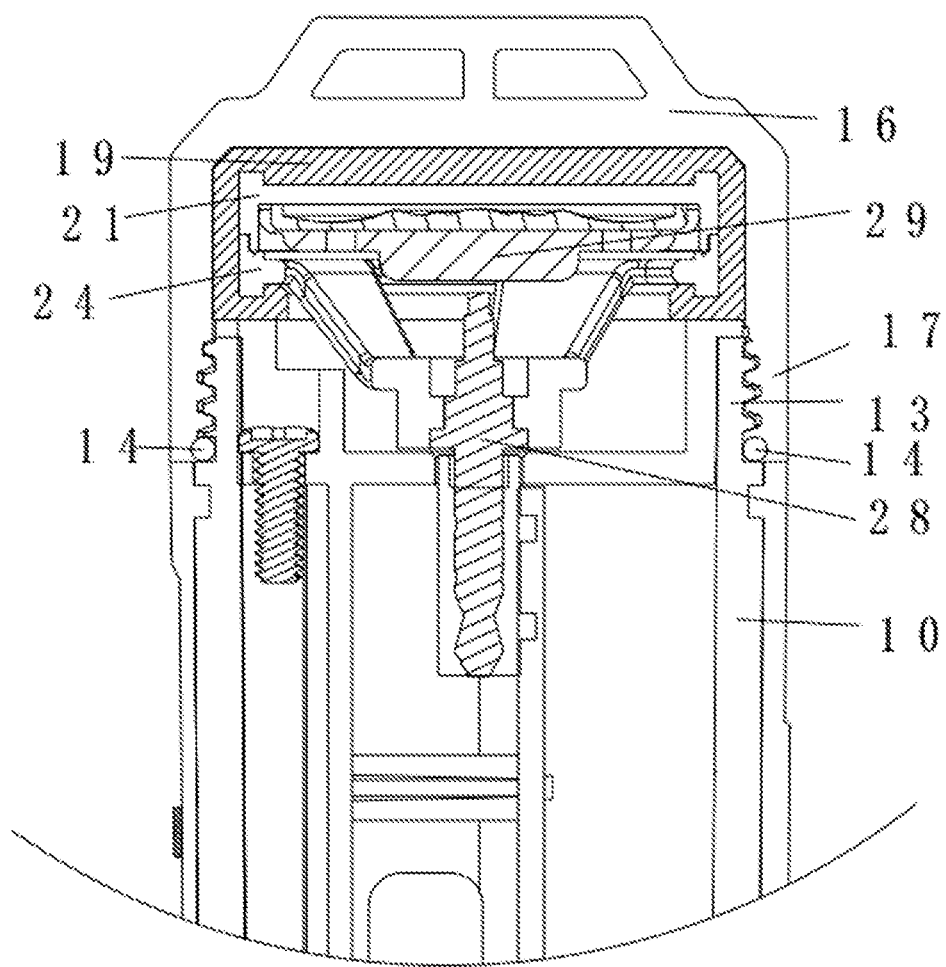
FIG. 7 shows a partial cross-sectional view of the audible end cap and the host according to the present application.
Figure 8:
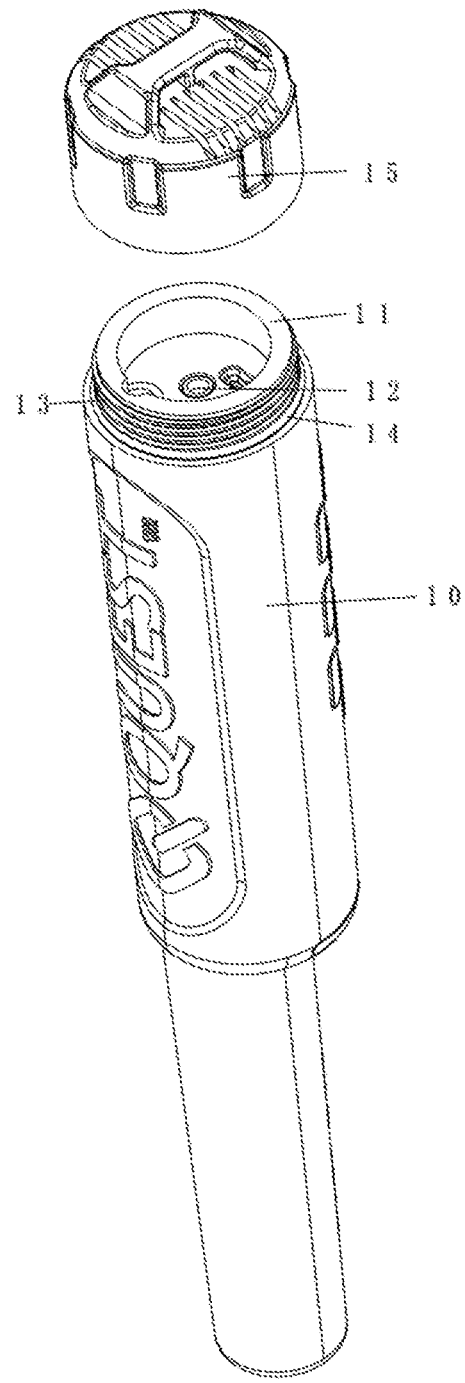
FIG. 8 shows an exploded view of the handheld metal detector according to the present application.
Figure 9:
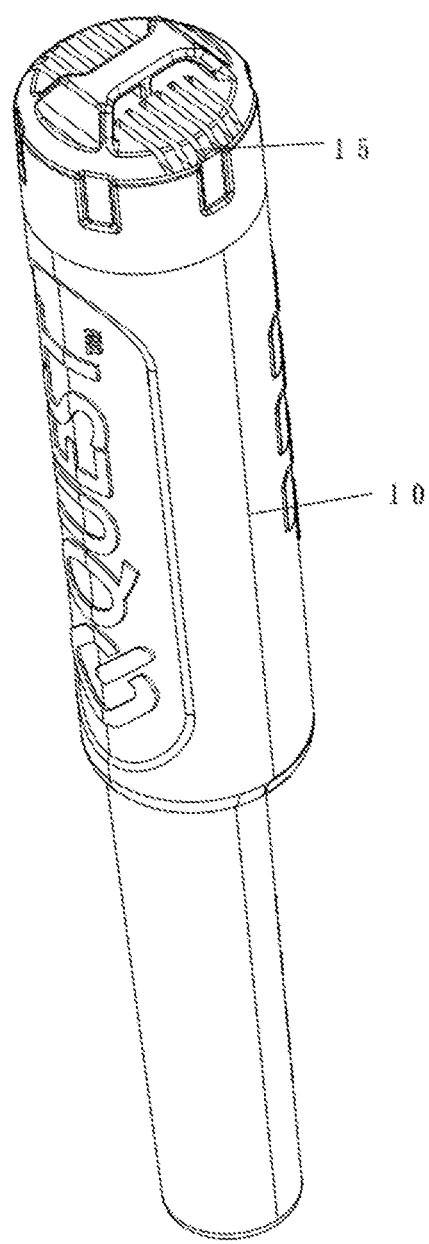
FIG. 9 shows a schematic diagram of the structure of the handheld metal detector according to the present application.

With reference to FIGS. 1 to 6, five types of audible end caps 15 designed according to actual needs are shown. These five types of audible end caps 15 are slightly different in internal structure and connection modes. With reference to FIGS. 1 and 2, the first connection mode of the audible end cap 15 is that the audio connector 28 is directly electrically connected to the waterproof loudspeaker 29. The audio connector 28 is an audio plug, and the audio output interface 12 is an audio socket. The audible end cap 15 can be electrically connected to the host 10 through the cooperation of the plug and the socket. With reference to FIG. 3, the second connection mode of the audible end cap 15 is that the audio connector 28 is a conductive wire, which is directly connected to the waterproof loudspeaker 29, and the conductive wire goes through the mounting barrel 27. The audio output interface 12 is correspondingly arranged as a conductive wire connection end. With reference to FIG. 4, the third connection mode of the audible end cap 15 is that the audio connector 28 is a spring pin electrical connector, and the audio output interface 12 is set as a corresponding connector. The spring pin connecter is electrically connected to the waterproof loudspeaker 29. With reference to FIG. 5, the connection mode of the audible end cap 15 is the same as that of the first connection mode, but there are some changes in the internal structure. Compared with the first type of the audible end cap 15, the protective collar 19 is removed from this audible end cap 15, and the first protective bracket 21 and the second protective bracket 24 are directly fixedly connected by resin sealant, and then the fixedly connected structure is fixedly installed in the back cover 16. With reference to FIG. 6, compared with the structure of the audible end cap 15 in FIG. 5, the first protective bracket 21 and the second protective bracket 24 are missing. The waterproof loudspeaker 29 is directly fixed in the back cover 16 through resin sealant, and a connecting wire from the waterproof loudspeaker 29 is electrically connected to the host 10.

Figure 10:
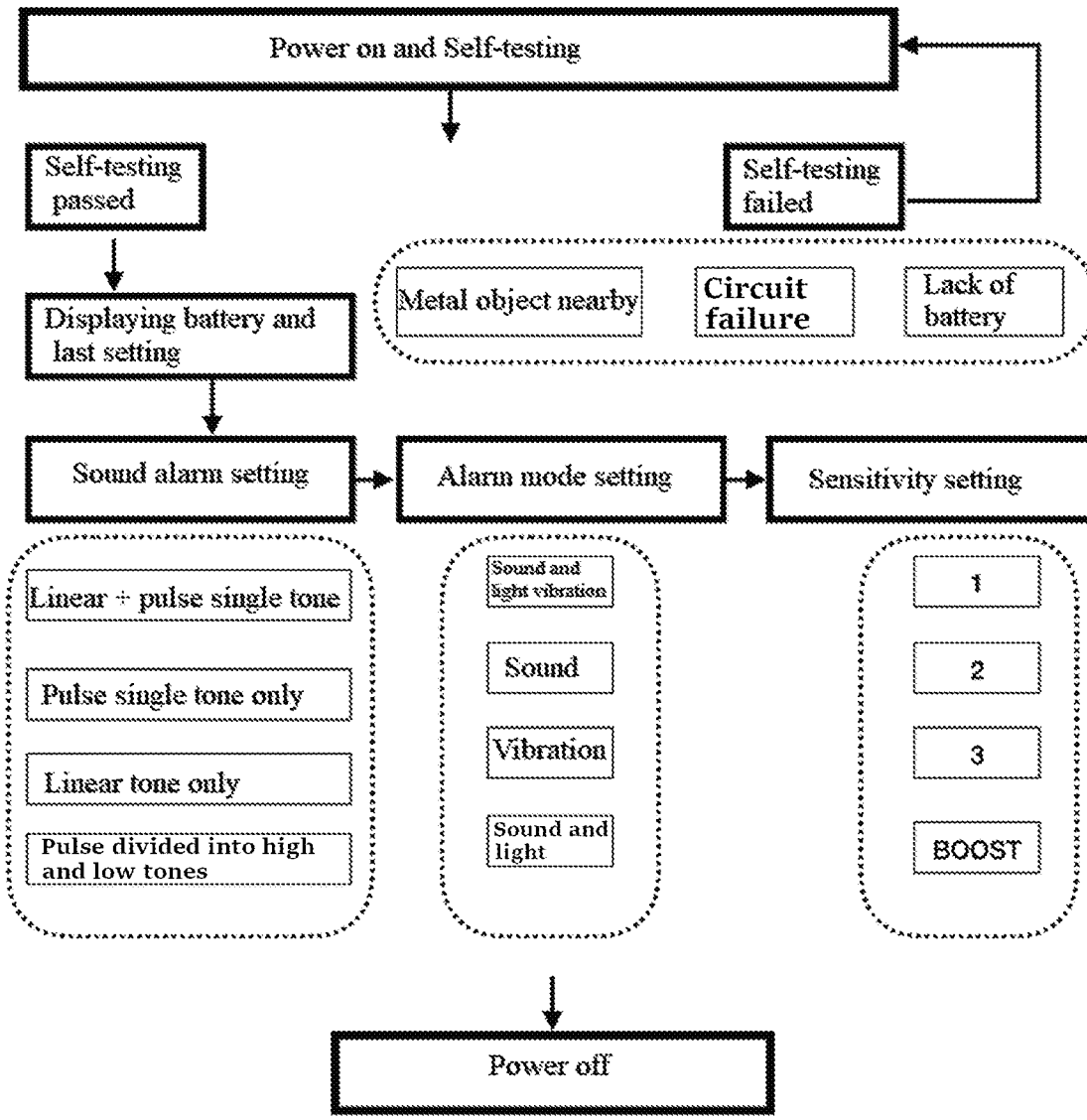
FIG. 10 shows a logical diagram of the button design of the handheld metal detector according to the present application.
Figure 11:
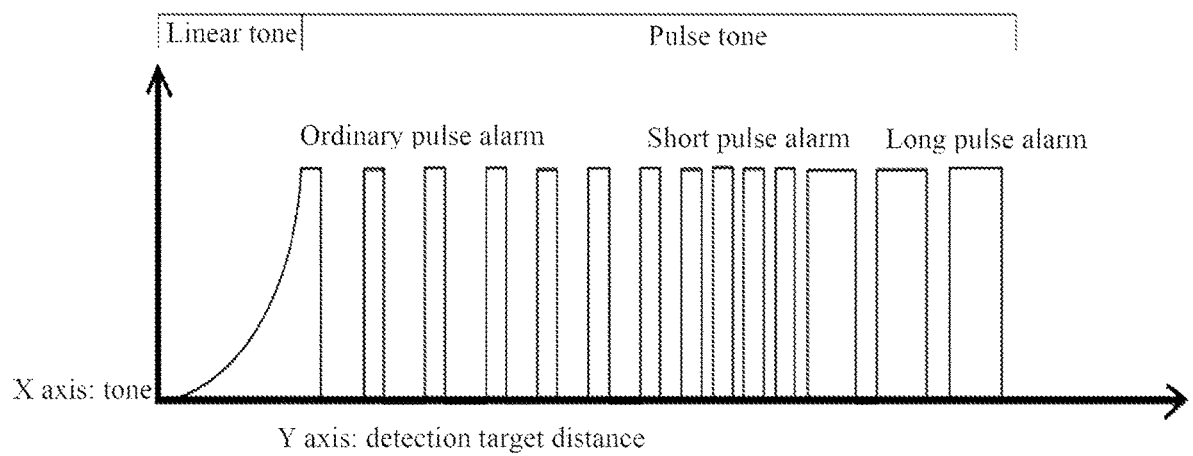
FIG. 11 shows an explanatory diagram of the linear-pulse mixed alarm mode of the handheld metal detector according to the present application.
Figure 12:
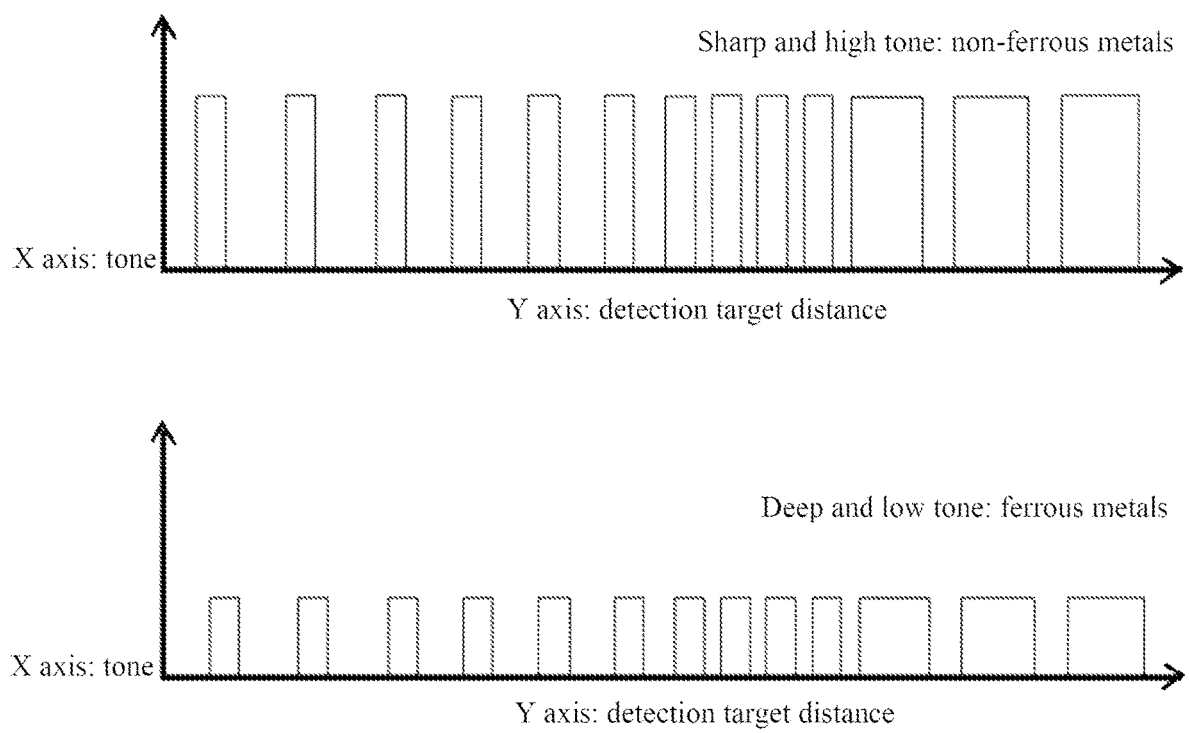
FIG. 12 shows an explanatory diagram of the handheld metal detector according to the present application with the pulse tone divided into high and low tones.

In the handheld metal detector provided in the present application, the host 10 is provided with an OLED screen and LED indicators for displaying menu operation information and real-time detection signals. There are separate red and green LED indicators on both sides to express the detection result with a variety of different types of information. For example, when red is displayed, it means that the handheld metal detector has detected ferrous metals, and when emerald green is displayed, it means that the handheld metal detector has detected non-ferrous metals. The host 10 is provided with buttons such as a power button and a menu button for adjusting the switch and gear position. With reference to FIG. 10, a logical corresponding diagram of the logic of the dual-button menu of the host 10 and the OLED screen display is shown, and the button logic on the host 10 is designed as shown in the figure. With reference to FIGS. 11 and 12, the alarm mode of the handheld metal detector provided in the present application can be clearly seen from the description diagram of the linear-pulse mixed alarm mode of the handheld metal detector and the description diagram of the pulse tone divided into high and low tones. When the pulse tone is sharp and high, it indicates that non-ferrous metals are detected. When the pulse tone is deep and low, it indicates that ferrous metals are detected. In the linear-pulse mixed alarm mode of the handheld metal detector, the sequence of linear and pulse can be reversed, that is, the long-distance target corresponds to a pulse alarm and the short-distance target corresponds to a linear one. In the same way, the high and low tones of the pulse tone can be reversed too.

It should be noted that the present application may have other various embodiments. Modifications and variations made by those skilled in the art based on the embodiments according to the present application without any creative work also fall within the scope of the present application.

What is claimed is:

1. An audible end cap, comprising:
   a waterproof loudspeaker, for generating multiple alarm sound combinations, wherein the diameter of the waterproof loudspeaker is greater than 2 cm;
   a back cover provided with a first connecting portion whereby the back cover is capable of being fixedly installed on a metal detector, wherein the waterproof loudspeaker is installed in the back cover;
   an audio connector electrically connected to the waterproof loudspeaker, wherein the waterproof loudspeaker is capable of receiving and emitting the sound signal output by the metal detector through the electrical connection between the metal detector and the audio connector;
   wherein the audible end cap further comprises a protective collar, a first protective bracket, and a second protective bracket, wherein the waterproof loudspeaker is fixedly clamped between the first protective bracket and the second protective bracket,
   wherein the protective collar is fixedly installed in the back cover and is sleeved and fixed on the outer periphery of the first protective bracket and the second protective bracket,
   and wherein the first protective bracket, the second protective bracket and the waterproof loudspeaker are all contained in the back cover.

2. The audible end cap according to claim 1, wherein the protective collar is provided with a snapping groove, the first protective bracket comprising a first snapping ring plate, and the second protective bracket comprising a second snapping ring plate, wherein the first snapping ring plate and the second snapping ring plate abut against each other and are fixedly engaged in the snapping groove.

3. The audible end cap according to claim 1, wherein the first protective bracket further comprises a docking ring plate, and the second protective bracket is provided with a docking groove, wherein the docking ring plate is inserted into the docking groove when the first protective bracket and the second protective bracket clamp and fix the waterproof loudspeaker.

4. The audible end cap according to claim 1, wherein the back cover is provided with a receiving cavity, and the protective collar is fixedly installed in the receiving cavity.

5. The audible end cap according to claim 1, wherein the second protective bracket further comprises a mounting barrel, and the audio connector penetrates the entire mounting barrel.

6. A handheld metal detector, comprising a host and an audible end cap, wherein the audible end cap comprises:
   a waterproof loudspeaker, for generating multiple alarm sound combinations, wherein the diameter of the waterproof loudspeaker is greater than 2 cm;
   a back cover provided with a first connecting portion whereby the back cover is capable of being fixedly installed on a metal detector, wherein the waterproof loudspeaker is installed in the back cover;
   an audio connector electrically connected to the waterproof loudspeaker, wherein the waterproof loudspeaker is capable of receiving and emitting the sound signal output by the metal detector through the electrical connection between the metal detector and the audio connector;
   wherein the host is provided with a second connecting portion, and the back cover is capable of being installed on the tail portion of the host through the screw connection between the first connecting portion and the second connecting portion.

7. The handheld metal detector according to claim 6, wherein the audible end cap further comprises a protective collar, a first protective bracket, and a second protective bracket, wherein the waterproof loudspeaker is fixedly clamped between the first protective bracket and the second protective bracket,
   wherein the protective collar is fixedly installed in the back cover and is sleeved and fixed on the outer periphery of the first protective bracket and the second protective bracket,
   and wherein the first protective bracket, the second protective bracket and the waterproof loudspeaker are all contained in the back cover.

8. The handheld metal detector according to claim 7, wherein the protective collar is provided with a snapping groove, the first protective bracket comprising a first snapping ring plate, and the second protective bracket comprising a second snapping ring plate, wherein the first snapping ring plate and the second snapping ring plate abut against each other and are fixedly engaged in the snapping groove.

9. The handheld metal detector according to claim 7, wherein the first protective bracket further comprises a docking ring plate, and the second protective bracket is provided with a docking groove, wherein the docking ring plate is inserted into the docking groove when the first protective bracket and the second protective bracket clamp and fix the waterproof loudspeaker.

10. The handheld metal detector according to claim 7, wherein the back cover is provided with a receiving cavity, and the protective collar is fixedly installed in the receiving cavity.

11. The handheld metal detector according to claim 7, wherein the second protective bracket further comprises a mounting barrel, and the audio connector penetrates the entire mounting barrel.

12. The handheld metal detector according to claim 6, wherein the host is further provided with an audio output interface, and the audio connector is capable of being inserted into the audio output interface.

13. The handheld metal detector according to claim 6, wherein a waterproof ring is fixedly sleeved at the bottom of the outer circumference of the second connecting portion, wherein the waterproof ring is capable of abutting against the first connecting portion when the first connecting portion is screwed and rotated to the bottom of the second connecting portion.

\* \* \* \* \*